United States Patent [19]

Smith, Jr. et al.

[11] 3,780,303

[45] Dec. 18, 1973

[54] PULSED NEUTRON LOGGING WITH BACKGROUND COMPENSATION

[75] Inventors: Harry D. Smith, Jr.; Dan M. Arnold; Ward E. Schultz, all of Houston, Tex.

[73] Assignee: Texaco Inc., New York, N.Y.

[22] Filed: Sept. 20, 1971

[21] Appl. No.: 182,037

[52] U.S. Cl. ............................. 250/301, 250/270
[51] Int. Cl. ............................................. G01t 1/16
[58] Field of Search ................ 250/83.6 W, 83.3 R

[56] References Cited
UNITED STATES PATENTS
3,662,172  5/1972  Youmans .................... 250/83.6 W
3,558,888  1/1971  Youmans .................... 250/83.6 W Primary Examiner—Walter Stolwein
Assistant Examiner—Davis L. Willis
Attorney—Thomas H. Whaley et al.

[57] ABSTRACT

An illustrative embodiment of the present invention includes method and apparatus for improved pulsed neutron logging. The use of very high repetitive rates in pulsed neutron logging using the inelastic gamma ray energy spectrum leads to lingering thermal neutrons from previous high energy neutron pulses. By gating pulses produced by the thermal background pupulation through the same energy windows chosen for observation in the primary logging function just prior to beginning a neutron pulse, storing the counts, and subtracting the counts from those occurring during the neutron pulse in the energy windows of interest, an improved, compensated, inelastic nuetron interaction log may be provided.

12 Claims, 3 Drawing Figures

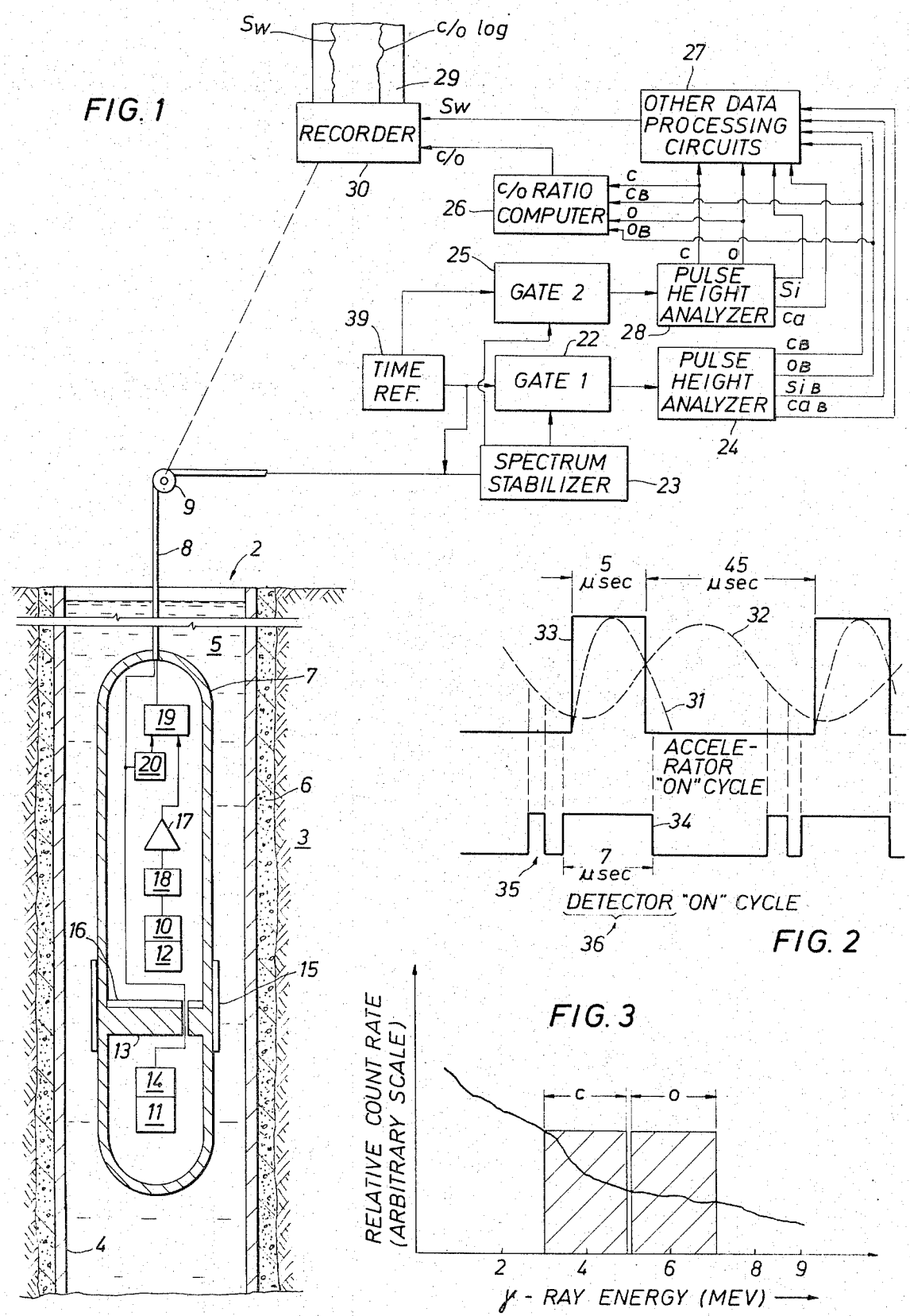

PULSED NEUTRON LOGGING WITH BACKGROUND COMPENSATION

BACKGROUND OF THE INVENTION

This invention relates to radiological well logging methods and apparatus for investigating the characteristics of subsurface earth formations traversed by a borehole and, more particularly, relates to improved neutron-gamma ray logging methods and apparatus.

It is well known that oil and gas are more likely to be found in commercially recoverabe quantities from relatively porous earth formations than from more highly consolidated and less permeable earth formations. It is also known that an oil or gas producing formation may be located by passing a neutron source through the borehole and measuring the intensity of secondary gamme ray radiation developing from the neutron irradiation as a function of borehole depth.

In particular a chlorine nucleus, which has a very high thermal neutron capture cross section (more so than that of the nuclei of other rather commonly found elements), is a good indicator of the location of salt water in subsurface earth formations. Thus, salt water filled limestone or sandstone layers will have a greater macroscopic thermal neutron capture cross section than similar formations which are oil saturated. By combining other porosity information, such as that detected by sonic or electrical resistivity logging tools, with the thermal neutron capture cross section data oil can be located. The greater macroscopic thermal neutron capture cross section has been observed in the past by measuring either chlorine capture gamma rays or the lifetime or decay constant of the thermal neutron population in the subsurface earth layer being investigated.

The above-mentioned salt water detection techniques have proven to be very useful in the past in locating oil and gas bearing earth formations. However, many spurious indications have been produced by depending on this logging technique due to the fact that the technique requires the presence of salinity in rather large amounts to be reliable. There has been no commercially available well logging method which could distinguish oil from water in earth formations where the water salinity was low. For example, the above-mentioned chlorine or neutron lifetime logs require water salinities in excess of about 30,000 parts per million sodium chloride before oil located in the pores of the earth formations can be reliably differentiated from water.

Accordingly, it has ben proposed in the prior art to make a measurement of at least a portion of the inelastic gamma ray energy spectrum from neutron irradiated earth formations. This has been proposed because carbon and oxygen nuclei in the earth formations surrounding the borehole can engage in appreciable inelastic neutron scattering even though the thermal neutron capture cross section of these nuclei is fairly small. This type of inelastic neutron logging has been limited in the past to some extent because the inelastic scattering cross sections for carbon and oxygen only become appreicalbe if relatively high energy neutrons are available to provide the interaction. In the past it has been difficult to provide sufficient quantities of highly energetic neutrons to reliably perform this type of log. The development of improved pulsed neutron generators has made possible the measurement of the inelastic scattering gamma ray energy spectrum from relatively high energy neutron irradiated earth formations. Attempts have been made to measure the carbon and oxygen inelastic scattering interactions with 14 MEV neutrons generated in pulsed neutron generators of the deuterium-tritium reaction type.

A problem which has arisen has been due to the fact that gamma rays generated in neutron inelastic scattering interactions can themselves engage in multiple Compton scattering interactions. Such gamma ray scattering generally tends to make the scattered gamma ray lose energy to some extent with each interaction. Thus, a higher energy gamma ray having a particular initial energy resulting from an inelastic scattering can appear to have totally different lower energy by the time it reaches the detector in the logging sonde due to the multiple Compton scatterings. This type of scattering process generally masks or smears peaks which might ordinarily occur in the inelastic gamma ray energy spectrum.

In order to obtain reasonable count rates at reasonable source to detector spacings it is desirable to repetitively generate the neutron pulses at as high a rate as practicable. However, when earth formations are repetitively irradiated by a pulsed neutron source at a very high repetition rate, some neutrons may still linger from the previous neutron pulse (in a thermalized condition) when the next or subsequent neutron pulse is emitted. Since these neutrons are thermalized, they can cause thermal neutron interactions producing gamma rays which could, during the subsequent neutron pulse, tend to be confused with the inelastic scattering gamma ray sought to be measured. This could occur because the inelastic gamma ray spectrum which is sought to be measured must be measured during the time interval that the neutron generator is on because the amount of high energy neutrons falls off very quickly due to the neutron scattering phenomena itself being a relatively strong interaction.

Accordingly, it is an object of the present invention to provide improved methods and apparatus for making gamma ray energy measurements from high energy neutron interactions in earth formations surrounding a well bore.

A further object of the invention is to provide new and improved methods and apparatus for determining the carbon/oxygen ratio in earth formations surrounding a borehole.

A still further object of the invention is to provide a well logging system having an optimal neutron pulse repetition rate to achieve good counting statistics in making inelastic neutron measurements.

The above and other objects, features and advantages of the present invention are provided in a pulsed neutron well logging system. The system utilizes a plurality of energy dependent windows or intervals to observe the relative count rates in selected portions of the inelastic gamma ray energy spectrum. Time dependent gating means isolate gamma rays resulting from the inelastic scattering of neutrons by the earth formations surrounding the well borehole. The timing means also provide a separate time dependent isolation of gamma rays just prior to each neutron pulse. Gamma rays observed during this separate interval are primarily the result of interactions caused by any thermal neutrons remaining in the vicinity of the gamma ray detector. Of course, some gamma rays due to natural formation radioactivity and some gamma rays due to neutron activation of the formation may also be detected in this manner. The separate time dependent isolation of gamma rays provides a background estimate of remaining thermal neutrons. At least two energy windows in the selected portions of the inelastic gamma ray energy spectrum are positioned and their width or energy range chosen so that the gamma rays resulting from inelastic scattering of neutrons (hereafter referred to as inelastic gamma rays) from carbon and oxygen may be detected. Gamma ray counts occurring in these energy windows during the separate time isolation period and resulting from thermal neutron capture, natural or activation gamma rays may then be subtracted from the counts due to gamma rays resulting from the inelastic scattering interactions. This background subtraction enables the repetition rate of the neutron pulses to be increased while not losing statistical accuracy in the counting because of the events caused by thermal neutrons. Optimal source to detector spacings, neutron pulse time duration, and pulse repetition rate for achieving an accurate measurement of the carbon/oxygen ratio are provided in the present invention.

The above and other objects, features, and advantages of the present invention are pointed out with particularity in the appended claims. The present invention is best understood by taking the following detailed description in conjunction with the intended drawings in which:

BRIEF DESCRIPTION OF THE DRAWINGS

FIG. 1 is an overall schematic diagram of the well logging system in accordance with the invention.

FIG. 2 is a timing diagram showing the relationship of an accelerator and detector on time with respect to the inelastic scattered neutrons and the thermal neutrons in the vicinity of the borehole.

FIG. 3 is a graphical representation of a gamma ray energy spectrum resulting from the inelastic scattering of neutrons and showing the relative locations of the carbon and oxygen inelastic gamma ray energy windows.

DESCRIPTION OF THE PREFERRED EMBODIMENT

Referring initially to FIG. 1 there may be seen a simplified functional representation in the form of a block diagram of well logging apparatus in accordance with the present invention. A bore hole 2 penetrating earth formation 3 is lined with steel casing 4 and filled with a well fluid 5. While it will generally be the case that borehole 2 has a well fluid therein, it is not necessary for the present invention to perform. The invention is also useful in empty or air filled boreholes. The steel casing 4 is cemented in place by cement layer 6 which also serves to prevent fluid communication between adjacent producing formations in the earth 3.

The downhole portion of the logging system is seen to be basically composed of an elongated, fluid tight, hollow, body member or sonde 7 which, during the logging operation, is passed longitudinally through the casing 4 and is sized for passage therethrough. Surface instrumentation, whose function will be discussed in more detail subsequently, is shown for processing and recording electrical measurements provided by the sonde 7. A well logging cable 8 passing over a sheave wheel 9 supports the sonde 7 in the borehole and also provides a communication path for electrical signals to and from the surface equipment and the sonde 7. The cable 8 may be of a conventional armoured well logging type and may have one or more electrical conductors for trasmitting such signals between the sonde 7 and the surface apparatus.

Again referring to FIG. 1, the sonde 7 contains a source or accelerator for producing high energy neutrons 11. The neutron source 11 contemplated for use herein is a pulsed neutron source operating from the principle of the deuterium-tritium reaction. However, it will be understood by those skilled in the art that the invention is not limited thereto. Other types of pulsed neutron sources may be used, if desired. A suitable radiation detector comprising a photomuliplier tube 10 and a detector crystal 12 is provided in the sonde 7 for detecting gamma rays resulting from the inelastic scattering of high energy neutrons by the earth formations 3 surrounding the well borehole 2. A radiation shield 13 of iron, lead, or other suitable material is interposed between the neutron accelerator 11 and the detector crystal 12 of the apparatus. Additionally, a thermal neutron shielding sleeve 15 is provided and may be located either as shown disposed about the exterior portion of the sonde 7 or, if desired, disposed on the interior wall portion thereof surrounding the detector crystal 12. A thermal neutron shielding disc 16 is also interposed between the radiation shielding material 13 and the detector crystal 12 to reduce the probability of gamma rays resulting from thermal neutron interactions in the detector. The detector crystal 12 may comprise a thallium doped sodium iodide, cesium iodide, or other like activated material which is optically coupled to the photomultiplier tube 10.

The radiation shielding 13 reduces the probability of direct irradiation of the detector crystal 12 by neutrons emitted from the pulsed neutron source 11. The thermal neutron shielding disc 16 and cylinder 15 surrounding the detector crystal 12 may be of a suitable material such as boron or any other material having a high thermal neutron capture cross section. This shield further serves to reduce the possibility of thermal neutrons which follow a tortous path or which have been slowed down by the borehole fluid 5 or shielding material 13 from reaching the vicinity of the detector crystal 12 and possibly causing neutron irradiation of the iodide or ther elements comprising the crystal. Moreover, the thermal neutron shield 15, 16 reduces the probability of thermal neutrons from a previous accelerated neutron pulse interacting materials in the sonde itself or the detector crystal itself and causing the emission of gamma radiation during the time period when the inelastic neutron gamma rays are being observed.

As well known in the art, the scintillation crystal 12 produces a discrete flash of light whenever a gamme ray passes therethrough and exchanges energy with the crystal lattice structure. The photomultiplier tube 10 generates a volage pulse proportional in height to the intensity of each such scintillation which occurs in the crystal 12. The intensity of such scintillations is functionally related to the energy of the gamma ray causing the light flash and thus a voltage pulse generated by the photomultiplier tube 10 has an amplitude functionally related to the energy of the corresponding gamma ray. These proportional voltage pulses produced by photomultiplier tube 10 comprise a detector signal which is supplied to a linear amplifier 17 via a discriminator 18.

The discriminator 18 may be used, if desired to discriminate, for example, against the reaction $I^{127}(N,\gamma) I^{128}$. A preset bias level may be used to pass only pulses from the photomultiplier tube 10 which exceed the height corresponding to 1.78 MEV gamma rays generated in the inelastic scattering of neutrons by silicon nuclei. Other low energy background gammas which would otherwise contribute to "pulse pileup" or too fast a count rate may also be eliminated by the discriminator 18 in this manner, if desired.

The neutron accelerator 11 is preferably operated by a pulsing circuit 14 which may be of conventional design as known in the art and which functions to operate the accelerator in short duration pulses. The pulse duration is preferably maintained as short as possible (in the vicinity of five microseconds) in order to minimize thermal neutron interactions during each pulse of fast neutrons. Timing pulses are supplied by a timing reference 39 and are communicated over the cable 8 conductors. The timing pulses are supplied to the operational pulser 14 for accelerator 11 and are also supplied to a downhole reference pulser 20. For example, the pulser circuit 14 could be activated by a timing pulse from the timing reference 39 to emit a neutron burst of a specified minimal time duration (approximately 5 microseconds). The repetition frequency of such bursts would then be controlled by the frequency of surface timing reference 39. Of course it will be appreciated that, if desired, the timing source 39 could be located in the downhole tool and pulses therefrom used in a similar manner at the surface to synchronize the operation of the system.

In making the inelastic scattering measurements contemplated by the present invention and using neutron pulses of approximately five microseconds duration, it is desirable to repeat the pulses at repetition rates up to approximately 20,000 times per second. It is desirable to maintain as high a repetition rate as possible so that a large integral counting rate may be had without having undesirable "pulse pileup" occur. Pulse pileup is, as previously mentioned, a too fast counting rate phenomena. This is due to the fact that a logging system such as that of the present invention, due to its electronic circuitry and the bandwidth limitation of the logging cable, has a finite instantaneous counting rate capability. Thus by obtaining optimal source to detector spacing this instantaneous rate limitation may be approached without being exceeded. Then by repeating the pulses as close together as possible a large integrated count may be achieved which enhances the statistical accuracy of the measurement.

Due to this very high pulse repetition rate encountered in the present invention, neutrons from a previous pulse will tend to still be present in a thermalized condition when a subsequent neutron pulse starts. This causes the rapid build up of count pulses due to the combined effect of thermal neutrons and inelastic scattering gamma rays and which, if not compensated for, could lead to difficulties. Referring now to FIG. 2, the relative time relationship of the neutron bursts or pulses to the operative portion of the gamma ray detector cycle and to the inelastic and thermal neutron populations are shown. The accelerator cycle is represented by the solid curve 33. The inelastic neutron population in the vicinity of the detector crystal 12 is represented by the dashed curve 31. The thermal neutron population in the vicinity of the detector is shown by the dotted line curve 32. The operative detector cycle is represented by the separate solid line curve 34. It will be noted that, for reasons to be discussed subsequently, for each neutron pulse generated two separate time isolation gate periods 35 and 36 of the detector are provided by gates 22 and 25. The second such time gate 36 provided by the gate 25 is chosen to roughly coincide with the neutron accelerator "on" cycle while the preceeding time gate 35 provided by the gate 22 is chosen to sample the neutron population in the vicinity of the detector by examining gamma rays produced thereby in the energy ranges of interest just prior to initiation of an accelerator cycle.

Still referring to FIG. 2, it will be noted that there is a sudden and rapid build up of the inelastic neutron population (curve 31) which is essentially present only during the neutron pulse. The thermal neutron population curve 32 builds up much slower and reaches a peak only after cessation of the 5 microseconds wide neutron pulse.

Referring again to FIG. 1, and bearing in mind this timing sequence, it will be observed that during the time interval that neutron accelerator 11 is activated, output signals from the photomultiplier tube 10 are conducted via the discriminator 18 and the linear amplifier 17 to a cable driver circuit 19 which may be of conventional design. The reference signal from reference pulser 20 has a known amplitude and is also supplied to the cable driver 19. The reference pulse provided by the downhole reference pulser 20 is utilized at the surface in a gain control device or spectrum stabilizer 23 to control a gain of the system in the manner described in the copending application Ser. No. 82,028 filed Oct. 19, 1970 which is assigned to the assignee of the present invention. This gain control function, of course, may be accomplished between neutron pulses if desired as the spectrum stabilizer 23 may be supplied with signals from the pulser 20 continuously or in any desired sequence.

Although not depicted in FIG. 1, it will be understood by those skilled in the art that electrical power may be supplied from a surface power source (not shown) via the well logging cable 8 to the downhole sonde 7. Suitable power supplies (not shown) are provided in the sonde 7 for powering the downhole portion of the equipment.

Since both the downhole pulse generator 14 and the surface gates 22 and 25 which control data pulses from the downhole tool are timed from the same time reference 39, it is apparent that synchronism may be maintained between the surface equipment and the downhole equipment. Thus, the detected data signals may be gated by the gates 22 and 25 to select portions thereof for processing which are timed as desired relative to the emission of the neutrons in the manner previously discussed with respect to FIG. 2.

The output signals from the first activated time gate 22 comprise a sequence of count pulses resulting from gamma rays detected by the downhole detector crystal 12 during the time intervals shown as 35. These pulses comprise data mainly from gamma rays resulting from nuclei in the vicinity of detector crystal 12 which have been excited from thermal and other background neutrons in the time isolation period of gate 35. The gamma rays generated by the absorption of thermalized neutrons will be referred to hereafter as thermal gamma rays.

The thermal gamma rays occurring during the gating interval 35 of FIG. 2 are supplied to a first pulse height analyzer 24. The pulse height analyzer 24 may be of conventional design as known in the art and having, for example, four or more channels or energy divisions corresponding to quantitizations of the pulse heights of the input pulses. The pulse height analyzer 24 functions to sort and accumulate a running total of the incoming pulses into a plurality of storage locations or channels based on the height of the incoming pulses which, it will be recalled, is directly related to the energy of the gamma ray causing the pulse. Thus, the pulse height analyzer functions as a memory means as well as an energy sorter. In this manner pulses occurring in selected energy "windows" may be separated from the totality of all pulses occurring in the time isolation period 35. Thus, a first group of background count pulses occurring in the portions of the energy spectrum illustrated in FIG. 3 as the carbon and oxygen windows (labelled $C_B$ and $O_B$) are output from the pulse height analyzer. Additionally other energy windows output (labelled $Si_B$ and $Ca_B$) may be output, if desired, for use in background correction of other data processing circuits 27. All such counts may be thought of as being accumulated and stored until needed in the background pulse height analyzer 24.

Referring now to FIG. 3, the relative count rate as a function of energy is shown for a typical earth formation. Two energy windows which are placed in a position chosen to emphasize the inelastic scattering peaks of carbon and oxygen are shown superimposed over the gamma ray energy spectrum. It has been found preferable to use a carbon energy window extending from approximtely 3.17 to 4.65 MEV. The oxygen energy window is chosen to extend from 4.86 to 6.34 MEV. The carbon and oxygen inelastic scattering peaks are covered together with their corresponding single and double pair production escape peaks. It will be understood, of course, that slight variations of this placement of energy windows could be made if desired without compromising the inventive concept drastically.

Output signals from the second activated time gate 25 similarly comprise a sequence of count pulse resulting from inelastic gamma rays occurring during the time intervals 36 in the vicinity of the detector crystal 12. The inelastic gamma rays counts occurring in time intervals 36 may be used, when corrected for background, to compute the C/O ratio as, for example, in the ratio computer 26. These data may also, if desired, be supplied to other data processing circuits 27 where other parameters such as the water saturation $S_W$ may be computed for example, in the manner shown in a copending patent application Ser. No. 182,035 filed Sept. 20, 1971 and assigned to the assignee of the present invention.

By supplying the inelastic gamma ray counts from the time gate 25 to a second pulse height analyzer 28 these may be broken down into their respective energy windows and stored in the same manner discussed with respect to the processing of the background counts by the pulse height analyzer 24. (Actually pulse height analyzers 24 and 28 may comprise two portions of memory of a single device if desired). Thus carbon and oxygen inelastic gamma ray data, labelled C and O may be supplied to the C/O ratio computer in this way. By appropriate relative placement of time gate intervals 35 and 36, then the carbon and oxygen window background counts $C_B$ and $O_B$ may be subtracted from the inelastic C and O counts before computing the C/O ratio in the ratio computer 26.

For this purpose the placement of the first gate time isolation opening 35 in the timing sequence is chosen as close as possible to the beginning of the detector cycle for the inelastic gamma rays. Gate time isolation interval 35 terminates just prior to the beginning of the second detector cycle 36. In this manner the thermal neutron population which is sampled is practically the same as that which causes the portion of the counts during the inelastic gating interval contributed by the thermal neutrons. The duration preferred for gate opening 35 to obtain the estimate of the thermal background gammas has been found to be about 5 microseconds. This duration could, of course, vary depending on conditions in the well. This interval should be chosen so as to sample the neutron population at a time when it approximates best the thermal neutrons remaining from the previous high energy neutron pulse.

By subtracting away the undesired background resulting from thermal neutrons in the C/O ratio computer 26 a more accurate carbon/oxygen ratio than heretofore obtainable is generated. This may be recorded on a record medium 29 by a recorder 30 driven as a function of borehole depth by the sheave wheel 9. If other energy windows such as those for Si and Ca are used, as illustrated in FIG. 1, the background subtraction principle of the invention may be applied to these data also as described above.

The above disclosure may make other embodiments of the invention apparent to those skilled in the art. It is the aim of the appended claims to cover all such changes and modifications as come within the true spirit and scope of the invention.

We claim:

1. A method for determining the characteristics of earth formations surrounding a well borehole comprising the steps of:
   repetitively irradiating the earth formations surrounding the well bore with relatively short duration pulses of high energy neutrons at a repetition rate of about 4,000 pulses per second or greater;
   detecting, just prior to each such pulse of high energy neutrons, the background gamma radiation due to thermal neutron capture and storing counts representative thereof;
   detecting, during each such pulse of high energy neutrons, gamma radiation due to the inelastic scattering of neutrons by materials comprising the earth formations surrounding the borehole and making counts representative thereof; and
   correcting said inelastic gamma ray counts to compensate for said background counts.

2. The method of claim 1 wherein the step of correcting said inelastic gamma ray counts is performed by subtracting said background counts from said counts occurring during said neutron pulses.

3. The method of claim 1 wherein the steps of detecting said background counts and said inelastic gamma ray counts are performed by detecting gamma rays having energies within certain preselected energy ranges in the gamma ray energy spectrum.

4. The method of claim 3 wherein said preselected energy ranges in the gamma ray energy spectrum are chosen to include inelastic gamma rays from carbon and oxygen nuclei.

5. The method of claim 4 wherein said preselected energy ranges comprise 3.17 MEV to 4.65 MEV for carbon and 4.86 MEV to 6.34 MEV for oxygen.

6. The method of claim 4 and wherein said preselected energy ranges are also chosen to include inelastic gamma rays from silicon and calcium nuclei.

7. The method of claim 1 wherein the steps are performed repetitively while moving a well tool through the borehole and the compensated inelastic gamma ray counts are logged as a function of borehole depth of said tool.

8. The method of claim 1 wherein the step of detecting just prior to each high energy neutron pulse the background gamma radiation, is performed by detecting gamma radiation occurring during a relatively short duration interval beginning and ending just prior to each said neutron pulse, said background gamma radiation detecting interval being of comparable duration with said inelastic gamma ray detection interval duration.

9. The method of claim 8 wherein said relatively short duration detection interval comprises approximately a five microsecond duration interval where said neutron pulses are also approximately five microseconds in duration.

10. The method of claim 1 wherein said neutron pulses are repeated up to 20,000 times per second.

11. A method for determining the carbon/oxygen ratio of earth formations surrounding a well borehole, comprising the steps of:
repetitively irradiating the earth formations surrounding the borehole with short duration pulses of fast neutrons;
detecting, just prior to each such neutron pulse, the background gamma radiation in energy windows of the gamma ray energy spectrum corresponding to inelastic gamma rays from carbon and oxygen nuclei and generating counts representative thereof;
detecting, during said neutron pulses, gamma radiation in energy windows of the gamma ray energy spectrum corresponding to inelastic gamma rays from carbon and oxygen nuclei and generating counts representative thereof;
correcting said inelastic gamma ray counts for said background gamma ray counts by subtracting said background counts from said inelastic counts; and
computing the ratio of counts of corrected carbon inelastic gamma ray counts to corrected oxygen inelastic gamma ray counts.

12. The method of claim 11 wherein the same steps are also performed in energy windows in the gamma ray energy spectrum corresponding to silicon and calcium inelastic gamma rays and the ratio of corrected silicon inelastic gamma ray counts to corrected calcium inelastic gamma ray counts is computed.

* * * * *